(12) United States Patent
Ul-Hamid et al.

(10) Patent No.: US 9,758,895 B2
(45) Date of Patent: Sep. 12, 2017

(54) ALUMINA-COATED CO-DEPOSIT AND AN ELECTRODEPOSITION METHOD FOR THE MANUFACTURE THEREOF

(71) Applicant: King Fahd University of Petroleum and Minerals, Dhahran (SA)

(72) Inventors: Anwar Ul-Hamid, Dhahran (SA); Hatim Dafalla Mohamed Dafalla, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 274 days.

(21) Appl. No.: 14/844,596

(22) Filed: Sep. 3, 2015

(65) Prior Publication Data

US 2017/0067179 A1  Mar. 9, 2017

(51) Int. Cl.
| | |
|---|---|
| *C25D 15/00* | (2006.01) |
| *C25D 5/18* | (2006.01) |
| *C25D 5/50* | (2006.01) |
| *B32B 15/16* | (2006.01) |
| *C25D 3/12* | (2006.01) |

(52) U.S. Cl.
CPC .............. *C25D 15/00* (2013.01); *B32B 15/16* (2013.01); *C25D 3/12* (2013.01); *C25D 5/18* (2013.01); *C25D 5/50* (2013.01); *B32B 2264/102* (2013.01); *B32B 2264/105* (2013.01)

(58) Field of Classification Search
CPC .................................. C09D 5/18; B32B 15/16
USPC ....... 428/546, 548, 551, 552, 553, 557, 561, 428/564, 565
See application file for complete search history.

(56) References Cited

U.S. PATENT DOCUMENTS

| | | | |
|---|---|---|---|
| 5,824,205 A | 10/1998 | Foster | |
| 5,833,829 A | 11/1998 | Foster | |
| 6,410,159 B1 * | 6/2002 | Hermanek | B22F 1/025 415/173.4 |
| 6,440,499 B1 * | 8/2002 | Wydra | C23C 10/30 427/295 |
| 2004/0131865 A1 * | 7/2004 | Kim | C23C 4/02 428/433 |
| 2013/0040166 A1 | 2/2013 | Box et al. | |
| 2015/0086796 A1 * | 3/2015 | Juez Lorenzo | B32B 5/16 428/450 |

FOREIGN PATENT DOCUMENTS

| | | |
|---|---|---|
| EP | 1411148 A1 | 4/2004 |
| EP | 2105520 A2 * | 9/2009 |
| EP | 2105520 B1 | 9/2009 |

OTHER PUBLICATIONS

"Preparation and Properties of Ceramic Al2O3 Coating as TBCs on MCrAlY Layer Applied on Inconel Alloy by Cathodic Plasma Electrolytic Deposition" authored by Bahadori et al. and published in Surface and Coatings Technology (2013) 228, S611-S614.*

* cited by examiner

*Primary Examiner* — Marc Zimmer
(74) *Attorney, Agent, or Firm* — Oblon, McClelland, Maier & Neustadt, L.L.P.

(57) ABSTRACT

An $Al_2O_3$-coated co-deposit including an Ni-based alloy substrate, an exterior layer present on a surface of the substrate, wherein the exterior layer comprises NiCrAlY or NiCoCrAlY particles with a diameter of 0.5-50 μm, Ni nanoparticles with a diameter of 0.1-10 nm in the form of a matrix, and $Al_2O_3$ particles that are present on the exterior surface of the exterior layer. A method for manufacturing the $Al_2O_3$-coated co-deposit whereby a substrate is immersed into a solution comprising at least one dissolved nickel salt, NiCrAlY or NiCoCrAlY particles, and Al particles in an electrochemical cell, DC current is pulsed into the electrochemical cell to electrodeposit Al, Ni, and NiCrAlY or NiCoCrAlY particles onto the substrate to form a deposited layer, and the substrate comprising the deposited layer is calcined to oxidize the Al particles and form the $Al_2O_3$-coated co-deposit.

19 Claims, 33 Drawing Sheets

| Element | Weight % |
|---------|----------|
| O K | 54.82 |
| Al K | 40.02 |
| Cr K | 0.83 |
| Ni K | 4.33 |

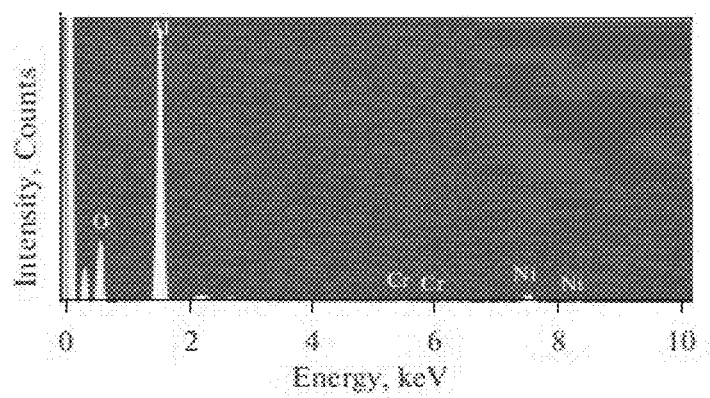

ALUMINA-COATED CO-DEPOSIT AND AN ELECTRODEPOSITION METHOD FOR THE MANUFACTURE THEREOF

BACKGROUND OF THE INVENTION

Technical Field

The present invention relates to an $Al_2O_3$-coated co-deposit, and an electrodeposition method for the manufacture thereof. More specifically, the present invention relates to an alloy substrate coated with a layer containing Ni, NiCrAlY, and $Al_2O_3$ and a method that uses a pulse electrodeposition solution technique.

Description of the Related Art

Metallic coatings, typically based on NiCrAlY or NiCoCrAlY constitution, are used as part of thermal barrier coatings (TBC) to provide environmental resistance to alloy substrates. The presence of Al in these compositions provides protective $Al_2O_3$ upon exposure to high temperature [See Padture, N., Gell, M., and Jordan, E., Science, 2002, vol. 296, p. 280 and Stott, E H. and Wood, G. C., Mater. Sci. Eng., Ser. A., 1987, p. 267, each incorporated by reference in their entirety]. It has been shown that the presence of a metallic coating promotes selective oxidation of Al thereby reducing the amount required to form $Al_2O_3$ [See Liu, Z., Gao, W., Dahm, K., and Wang, E, Acta Mater., 1998, vol. 46, p. 1691, incorporated herein by reference in its entirety]. The presence of Cr in the coating, in particular, contributes to selective oxidation of Al whereas Y serves to enhance scale adherence.

$Al_2O_3$-based coatings are important because alumina retards oxidation processes and provides protection to the underlying alloy during service [See Kofstad, P., *High Temperature Corrosion*, N.Y.: Elsevier Appl. Sci., 1988, incorporated herein by reference in its entirety]. Further, the presence of $Al_2O_3$ provides lowered oxidation rate and improved spallation resistance [See Liu, Z., Gao, W, and Li, M., Oxidation Met., 1998, vol. 51, p. 403, incorporated herein by reference in its entirety]. The protective nature of the $Al_2O_3$ is improved due to the presence of reactive elements such as Y, $Y_2O_3$, Hf, etc., which enhance scale adherence and reduce its grain size and growth rate [See Ul-Hamid, A., Oxidation Met., 2002, vol. 58, p. 23, incorporated herein by reference in its entirety]. The service life of the metallic coating depends on its composition and structure as well as on the composition of the underlying alloy substrate. In particular, the heat protection properties of the coatings are dependent on the amount of $Al_2O_3$ present on the surface.

Metallic coatings generally have a thickness ranging from 75 to 150 µm, and these coatings can be deposited using various techniques including plasma-spray, electron beam physical vapor deposition, magnetron sputter deposition, chemical vapor deposition, etc. However, these techniques have several drawbacks, including the need for a relatively elaborate setup and the expense required to carry out. Moreover, these processes are line of sight processes, and do not work well for complex and intricate shapes that include hidden surfaces.

Electrodeposition is a relatively easy and cost effective technique for coating substrates [See Saremi, M. and Bahraini, M., Trans. Inst. Met. Fin., 2003, vol. 81, p. 24; U.S. Pat. No. 5,824,205, 1998; and U.S. Pat. No. 5,833,829, 1998, each incorporated herein by reference in their entirety]. Electrodeposition is a non-line of sight process and can potentially be used to coat complex shapes and hidden surfaces. In addition, primary processing is carried out close to ambient temperatures allowing cost savings during the manufacturing process. Further, electrodeposition has the potential to be used as a repair technique for gas engine components resulting in cost reductions during maintenance and servicing [See U.S. Pat. No. 6,998,151, 2006, incorporated herein by reference in its entirety]. While pulse electrodeposition is expected to produce an overall smooth, dense and fine-grained coating structure [See Ul-Hamid, A., Dafalla, H., Quddus, A. et al., Appl. Surf. Sci., 2011, vol. 257, p. 9251, incorporated herein by reference in its entirety], previously published work on the synthesis of bond coats using this technique is limited [See Foster, J., Cameron, B. R, and Carew, J. A., Trans. Inst. Met. Finish, 1985, vol. 63, p. 115 and Zhou, Y., Peng, X., and Wang, E, Scripta Mater , 2004, vol. 50, p. 1429, each incorporated herein by reference in their entirety].

In view of the forgoing, the objective of the present disclosure is to provide an $Al_2O_3$-coated co-deposit that includes a superalloy substrate coated with NiCrAlY particles, Ni grains, and $Al_2O_3$, and a method of manufacturing the $Al_2O_3$-coated co-deposit using a pulse electrodeposition technique.

BRIEF SUMMARY OF THE INVENTION

According to a first aspect, the present disclosure relates to a $Al_2O_3$-coated co-deposit including i) a Ni-based substrate ii) an exterior layer comprising NiCrAlY or NiCoCrAlY particles with a diameter of 0.5-50 µm iii) Ni grains with a diameter of 0.1-10 nm, in the form of a matrix and iv) $Al_2O_3$ grains that are present on the exterior surface of the exterior layer.

In one embodiment, the Ni-based substrate comprises 40-50 wt % Ni, 20-25 wt % Cr, 15-20 wt % Fe, and 6-12 wt % Mo, relative to the total weight of the substrate.

In one embodiment, the layer comprises NiCrAlY particles.

In one embodiment, the layer comprises NiCoCrAlY particles.

In one embodiment, the $Al_2O_3$ grains have a diameter of 1-20 µm.

In one embodiment, 40-90% of a surface of the co-deposit is covered by the $Al_2O_3$ particles.

In one embodiment, the wt % of $Al_2O_3$ particles is 1-5% relative to the total weight of the exterior layer.

In one embodiment, the NiCrAlY particles comprise 64-74% Ni, 17-25% Cr, 6-14% Al, and 0.5-3% Y In one embodiment, the exterior layer comprises NiCrAlY or NiCoCrAlY particles with a diameter of 1-10 µm.

In one embodiment, the average thickness of the exterior layer is 50-200 µm.

In one embodiment, the $Al_2O_3$-coated co-deposit has a porosity of 5% or less.

According to a second aspect, the present disclosure relates to a method for manufacturing the $Al_2O_3$-coated co-deposit of claim 1, the method comprising i) immersing at least one surface of the substrate in a solution comprising at least one dissolved nickel salt, NiCrAlY or NiCoCrAlY particles, and Al particles in an electrochemical cell comprising a cathode comprising the substrate and an anode containing Ni ii) pulsing DC current into the electrochemical cell to electrodeposit Ni, along with Al and NiCrAlY or NiCoCrAlY particles onto the substrate to form a deposited layer comprising Ni, NiCrAlY or NiCoCrAlY particles, and Al particles and iv) calcining the substrate comprising a deposited layer to oxidize the Al particles and form the Al$_2$O$_3$-coated co-deposit.

In one embodiment, the solution comprises nickel sulfate, nickel chloride, and boric acid.

In one embodiment, the solution comprises 240-260 g/L of nickel sulfate, 40-60 g/L of nickel chloride, and 40-45 g/L of boric acid.

In one embodiment, the pH of the solution is 3.3-3.9 and the temperature is 40-50° C. during the pulsing.

In one embodiment, the pulsing DC current has a maximum amplitude of 7 A.

In one embodiment, the pulsing comprises a repeating sequence with a DC current on-time for 1-4 ms followed by a DC current off-time for 8-12 ms.

In one embodiment, the maximum amplitude of the DC current of the repeating sequence is the same during each DC current on time.

In one embodiment, the duration of the DC current on-times is the same, and the duration of the DC current off-times are the same during the repeating sequence.

In one embodiment, the temperature during the calcining is 900-1,200° C.

In one embodiment, the Al powder forms a deposited layer that shows reduced porosity after calcining to form the Al$_2$O$_3$-coated co-deposit.

In one embodiment, the presence of Al powder in the solution increases a surface coverage of Al$_2$O$_3$ on the co-deposit relative to the same method under the same conditions without the presence of Al powder in the solution.

In one embodiment, the substrate has a complex shape with at least one hidden surface that is coated with the deposited layer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10B is an EDS spectrum of oxidized sample showing formation of Al$_2$O$_3$ at the top surface of the NiCrAlY particles. FIG. 10C is the corresponding elemental composition of Al$_2$O$_3$ at the top surface of the NiCrAlY particles.

DETAILED DESCRIPTION OF THE EMBODIMENTS

Figure 1A:
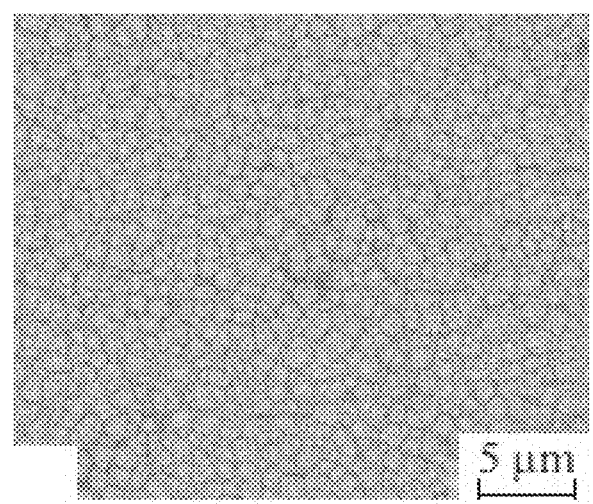
FIG. 1A is a SEM image of the top surface of Ni coating obtained without co-deposition of NiCrAlY powder.

Referring now to the drawings.

According to a first aspect, the present disclosure relates to an Al$_2$O$_3$-coated co-deposit including a Ni-based substrate that is a superalloy. The term "substrate" and "Ni-based substrate" as used herein refers to the Ni-based cathode of an electrochemical cell, onto which a single or a plurality of materials are electrodeposited to form a surface coated substrate. The substrate may be a non-porous starting material that becomes coated, and the interface between the substrate and the coating material is pore-free. Further, the bulk of the co-deposit is the substrate, where the deposited material forms a thin coating layer on top of the surface of the substrate. Therefore, the general shape and size of the substrate may dictate the shape and size of the coated deposit product. A cathode of the present disclosure may be coated with one or a plurality of coatings or layers. Therefore, a cathode that has been coated with one or more layers may also be defined as the "substrate" onto which an additional coating is added. The substrate may be flat with no hidden surfaces. The substrate may also have a rounded or curved shape with no hidden surfaces. The substrate may also be of a complex shape and have a plurality of protrusions and cavities with one or more hidden surfaces. A "hidden surface" refers to a surface that does not have a direct line of sight and that cannot be coated using a direct spray, stream, etc.

An alloy is a material composed of two or more metals or a metal and a nonmetal. Alloy materials may be a solid solution of these elements as a single phase, a mixture of metallic phases, or an intermetallic compound with no distinct boundary between phases. A superalloy, or high-performance alloy, is an alloy that exhibits excellent mechanical strength, resistance to thermal creep deformation, good surface stability, and resistance to corrosion or oxidation. Superalloys develop high temperature strength through solid solution strengthening by forming secondary phase precipitates such as gamma prime and carbides. Oxidation or corrosion resistance is provided by elements such as aluminum and chromium. Superalloys are often intended to be used for high temperature applications, and thus must withstand loading at temperatures near their melting point. Further, their creep and oxidation resistance are of primary importance. Ni based superalloys are often used for these high temperature applications. The properties of these Ni-based superalloys can be tailored to a certain extent through the addition of many other elements, both common and exotic, including not only metals, but also metalloids and nonmetals which include chromium, iron, cobalt, molybdenμm, tungsten, tantalum, aluminμm, titanium, zirconium, niobium, rhenium, ruthenium, yttrium, vanadium, carbon, boron, silicon, manganese, hafnium, and the like. Examples of such superalloys are Hastelloy, Inconel, Waspaloy, Rene alloys, Haynes alloys, Incoloy, MP98T, TMS alloys, and CMSX single crystal alloys.

In one embodiment, the substrate is a Hastelloy substrate. Hastelloy X is a nickel-chromium-iron-molybdenum alloy that has wide use in gas turbine engines for combustion zone components such as transition ducts, combustor cans, spray bars and flame holders as well as in afterburners, tail pipes and cabin heaters. Hastelloy X is used in industrial furnace applications due to its resistance to oxidizing, reducing and neutral atmospheres. It is also used in the chemical process industry for retorts, muffles, catalyst support grids, furnace baffles, tubing for pyrolysis operations and flash drier components. In one embodiment, the substrate comprises Ni, Cr, Fe, and Mo with 40-50 wt % Ni, 20-25 wt % Cr, 15-20 wt % Fe, and 6-12 wt % Mo, relative to the total weight of the substrate. More preferably, the substrate comprises 45-49 wt % Ni, 20-24 wt % Cr, 17-20 wt % Fe, and 7-11 wt % Mo. Even more preferably, the substrate comprises 46-48 wt % Ni, 21-23 wt % Cr, 18-19 wt % Fe, and 8-10 wt % Mo. It is envisaged that other elements, such as the elements mentioned heretofore, may be present in the substrate in addition to Ni, Cr, Fe, and Mo.

"Coating", "coat", or "coated" as used herein, refers to a covering that is applied to a surface of a substrate. The coating may be an all-over coating, whereby the % surface area coverage of the surface being coated is at least 80%, at least 85%, is at least 90%, at least 95%, at least 96%, at least 97%, at least 98%, at least 99%. In some cases, the coating may incompletely cover, or only cover portions of the surface being coated, whereby the % surface area coverage of the surface being coated is at least 10%, at least 20%, is at least 30%, at least 40%, at least 45%, at least 50%, at least 55%, at least 60%, at least 65%, at least 70%, at least 75%. The "coating" or "coat" may refer to one material (i.e. element, metal, non-metal) that covers a surface of a substrate, or alternatively, the coating may refer to a plurality of materials that cover a surface of a substrate. The plurality of materials may be applied to a substrate as a mixture or sequential applications of the individual materials. With sequential applications of individual materials, it may be possible to form multiple layers that are distinct from one another. The terms "layer" or "layers" may be used synonymously with coating or coat. The term "exterior layer" is used to describe the coating that covers a surface of the substrate as a whole. For instance, a substrate may be covered with three distinct layers, and all three layers are referred to herein as the "external layer". In the case where three distinct materials are used to coat the substrate, but no distinct layers are formed, the mixture of the three materials in the coating may also be referred to as the external layer. The coating thickness of the present disclosure may be varied depending on the coating materials and the process for applying the coating.

Electroplating is a process that uses electric current to reduce dissolved metal cations so that they form a coherent metal coating on an electrode. Electroplating is primarily used to change the surface properties of an object (e.g. abrasion and wear resistance, corrosion protection, etc.). The substrate to be coated is the cathode of the circuit. In one technique, the anode is made of the metal to be plated or coated onto on the substrate. Both the cathode and the anode are immersed in an electrolyte solution containing one or more dissolved metal salts, other ions that permit the flow of electricity, or other particles which may also coat the substrate. A power supply supplies a direct current to the anode, oxidizing the metal atoms that it comprises and allowing them to dissolve in the solution. At the cathode, the dissolved metal ions in the electrolyte solution are reduced at the interface between the solution and the cathode, such that they "plate out" onto and coat the cathode. Pulse electroplating is a modified electroplating process that involves the swift alternating of the potential or current between two different values resulting in a series of pulses of equal amplitude, duration and polarity, separated by zero current. By changing the pulse amplitude and width, it is possible to change the deposited film's composition and thickness.

In the present disclosure, a "deposit" refers to a substrate that is coated by one or more materials (e.g. metal, element, particle) through an electroplating process, while a "co-deposit" refers to a substrate that is coated by two or more materials (e.g. elements, metals, particles, etc.) through an electroplating process to form a mixed coating or a layered coating. The deposit includes the substrate and one or more layers deposited thereon. In the present disclosure, particles or nanoparticles (depending on their size) that are deposited onto the substrate may also be referred to as "grains".

The $Al_2O_3$-coated co-deposit of the present disclosure further includes NiCrAlY or NiCoCrAlY particles that are deposited onto a surface of the substrate to form a coated substrate. Preferably the particles are spherical or substantially spherical. In one embodiment, the NiCrAlY or NiCoCrAlY particles have a diameter of 0.5-50 µm, preferably 0.7-40 µm, preferably 0.8-30 µm, preferably 0.9-20 µm, preferably 1-15 µm, more preferably 1-10 µm.

In an alternative embodiment, larger NiCrAlY or NiCoCrAlY particles are deposited onto a surface of the substrate to form a coated substrate. In one embodiment, these larger NiCrAlY or NiCoCrAlY particles have a diameter of 5-65 µm, preferably 15-55 µm, preferably 16-50 µm, preferably 19-45 µm, preferably 20-40 µm, more preferably 20-35 µm. In one embodiment, the $Al_2O_3$-coated co-deposit includes NiCrAlY particles comprising 64-74% Ni, 17-25% Cr, 6-14% Al, and 0.5-3% Y, preferably 66-72% Ni, 19-23% Cr, 8-12% Al, and 0.5-2% Y, more preferably 67-70% Ni, 20-22% Cr, 9-11% Al, and 0.5-1.5% Y, although the composition ratio is not particularly limited in the present disclosure. In one embodiment, the NiCrAlY or NiCoCrAlY particles cover at least 30%, at least 40%, at least 50% of the surface area of the substrate. In one embodiment, both NiCrAlY and NiCoCrAlY particles are present in the co-deposit, and the ratio of NiCrAlY to NiCoCrAlY particles is 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10.

Further, secondary particles with comparable sizes may be used in addition to, or in lieu of the NiCrAlY or NiCoCrAlY particles. These secondary particles may comprise an elemental mixture that is distinct from NiCrAlY or NiCoCrAlY particles (for example CoCrAlY, etc.), so long as the secondary particles impart beneficial properties (e.g. thermal stability, creep prevention, etc.) to the $Al_2O_3$-coated co-deposit. Other such secondary particles that impart beneficial properties are known to those of ordinary skill in the art.

Due to the relatively large diameter of the NiCrAlY and the NiCoCrAlY particles, these particles may form a porous surface coating, with a void space being located in between the NiCrAlY or NiCoCrAlY particles that form the coating. However, the porosity can be reduced by employing fine NiCrAlY or NiCoCrAlY particles during co-deposition. Fine NiCrAlY or NiCoCrAlY particles that reduce the porosity of the co-deposits may have a particle size ranging from 0.5-5 µm, preferably 0.7-4 µm more preferably 0.9-3 µm or a submicron particle size, for example 0.1-1 µm.

In one embodiment, the NiCrAlY particles have a weight % ranging from 1-10 wt %, preferably 2-8 wt %, more preferably 3-6 wt % relative to the total weight of the $Al_2O_3$-coated co-deposit.

In one embodiment, the NiCoCrAlY particles have a weight % ranging from 1-10 wt %, preferably 2-8 wt %, more preferably 3-6 wt % relative to the total weight of the $Al_2O_3$-coated co-deposit.

The $Al_2O_3$-coated co-deposit also includes Ni nanoparticles, which form a Ni matrix that coats the coated substrate to form a co-deposit. The Ni nanoparticles of the present disclosure are substantially pure Ni, where the weight percent of Ni is greater than 90%, preferably 95%, preferably 96%, preferably 97%, preferably 98%, preferably 99%, more preferably 99.5% relative to the total weight of the Ni nanoparticles. In one embodiment, the Ni nanoparticles have a diameter of 0.1-10 nm, preferably 0.5-8 nm, more preferably 1-5 nm. In one embodiment, the Ni nanoparticles are in direct contact with the substrate. Alternatively, the nickel nanoparticles are in direct contact with the NiCrAlY or NiCoCrAlY particles that coat a surface of the substrate. In one embodiment, the Ni nanoparticles are in direct contact with $Al_2O_3$ particles. In a preferred embodiment, the Ni nanoparticles are in direct contact with a plurality of surfaces, which may include the substrate, the NiCrAlY or NiCoCrAlY particles, $Al_2O_3$ particles, or combinations thereof. Therefore, the nickel matrix may help the NiCrAlY particles and/or the $Al_2O_3$ particles to adhere to a surface of the substrate or deposit by entrapping the larger NiCrAlY, NiCoCrAlY, or $Al_2O_3$ particles and forming multiple points of contact to those particles and the substrate/deposit surface.

In one embodiment, the Ni nanoparticles have a weight % ranging from 0.1-2 wt %, preferably 0.2-1.5 wt %, more preferably 0.5-1 wt % relative to the total weight of the $Al_2O_3$-coated co-deposit.

In one embodiment, the void space generated between the large NiCrAlY particles and the substrate surface is reduced by inclusion of Ni nanoparticles in the co-deposit. In this disclosure, "porosity" is an index showing a ratio of void volume with respect to an entire volume of the coating of the co-deposit. The porosity can be calculated, for example, by taking a photograph of the cross sectional structure, measuring a total void area using the photograph, and calculating the porosity as a ratio of void area with respect to an entire cross sectional area of the coating layer on the co-deposit. In one embodiment, the $Al_2O_3$-coated co-deposit has a porosity of 5% or less, preferably 4% or less, preferably 3% or less, preferably 2% or less, more preferably 1% or less, even more preferably 0.5% or less, even more preferably 0.1% or less.

In one embodiment, the anodic metal (e.g. nickel) may form a thin coating in direct contact with the substrate prior to depositing any other coating material onto the substrate. In electroplating, this process is referred to as flash, and in the case of a nickel anode, nickel flash. In this scenario, the nickel deposit may cover at least 30%, preferably at least 40%, more preferably at least 50%, even more preferably at least 60% of the surface area of the substrate. This initial layer of anodic metal may help subsequent coatings to adhere to the deposit or substrate.

The $Al_2O_3$-coated co-deposit also has $Al_2O_3$ particles that are present on a surface of the co-deposit (i.e. present as part of the external layer), wherein the $Al_2O_3$ particles protect the co-deposit from oxidative processes. In one embodiment, the $Al_2O_3$ particles have a diameter of 1-20 µm, preferably 2-15 µm, more preferably 3-12 µm. In one embodiment, 40-90%, preferably 45-85%, more preferably 50-80% of a surface of the co-deposit is covered by the $Al_2O_3$ particles. In one embodiment, the wt % of $Al_2O_3$ particles is 1-5%, preferably 1-4%, more preferably 1-3% relative to the total weight of the $Al_2O_3$-coated co-deposit.

In one embodiment, the average thickness of the coating of the Al-coated co-deposit (i.e. the external layer prior to calcining or NiCrAlY/NiCoCrAlY particles+Ni nanoparticles+Al) is 45-200 µm, preferably 50-190 µm, more preferably 50-180 µm, even more preferably 50-175 µm, even more preferably 50-160 µm. In one embodiment, the average thickness of the coating of the $Al_2O_3$-coated co-deposit (i.e. the external layer after calcining or NiCrAlY/NiCoCrAlY particles+Ni nanoparticles+$Al_2O_3$) is 50-200 µm, preferably 50-190 µm, more preferably 60-175 µm, even more preferably 50-150 µm.

In addition to the metals present in the substrate, the NiCrAlY or NiCoCrAlY particles, the Ni nanoparticles, and the aluminum or alumina, additional metals may be present in the external layer depending on the materials and conditons used to manufactutre the co-deposits herein. The additional metals may be tungsten, tantalum, titanium, zirconium, niobium, rhenium, ruthenium, vanadium, carbon, boron, silicon, manganese, hafnium, and the like. These metals may be present in trace quantities (i.e. less than or equal to 0.5%) or may be present in substantial quantities (i.e. greater than 0.5%) relative to the total metal composition of the $Al_2O_3$-coated co-deposit.

The $Al_2O_3$-coated co-deposit may be used for the manufacture of turbine engines (e.g. aerospace and marine turbine engines), particularly superalloy components thereof, such as gas turbine shafts, rings, disks, combustion can ware, stator and rotor blades and guide vanes, transition ducts, spray bars, flame holders as well as in afterburners, tail pipes, cabin heaters, retorts, muffles, catalyst support grids, furnace baffles, tubing for pyrolysis operations and flash drier components. The $Al_2O_3$-coated co-deposit may also be used in machinery, vehicles, or fixed installations which incorporate such parts.

According to a second aspect, the present disclosure relates to a method for manufacturing the $Al_2O_3$-coated co-deposit of the present disclosure, in one or more of its embodiments, the method involves immersing at least one surface of the substrate in a solution comprising at least one dissolved nickel salt, NiCrAlY or NiCoCrAlY particles, and Al particles in an electrochemical cell comprising a cathode comprising the substrate and an anode containing Ni. In one embodiment, the particle diameter of the Al powder is 3-15 µm, preferably 4-12 µm, more preferably 5-10 µm and the NiCrAlY or NiCoCrAlY particles have a diameter of 0.5-50 µm, preferably 0.7-40 µm, preferably 0.8-30 µm, preferably 0.9-20 µm, preferably 1-15 µm, more preferably 1-10 µm. The addition of the Al powder may provide an increased amount of Al attached to the surface of the co-deposit, which after calcination may lead to an increased amount of $Al_2O_3$ and therefore an increase resistance to high temperatures.

In nickel electroplating, a Watt's bath can be used to deposit both bright and semi-bright nickel as a thin layer onto a metal substrate. In one embodiment, the electrochemical cell is a Watt's electrochemical cell. In one embodiment, the solution of the Watt's electrochemical cell comprises nickel sulfate, nickel chloride, and boric acid. In one embodiment, the Watt's electrochemical cell comprises 240-260 g/L of nickel sulfate, 40-60 g/L of nickel chloride, and 40-45 g/L of boric acid. In one embodiment, the pH of the solution is 3.3-3.9 and the temperature is 40-50° C. during the pulsing. These Watt's bath component concentrations, as well as operating pH and temperature are just one example for operating conditions, and these concentrations and conditions may be varied depending on the electroplating application. Further, additives such as brighteners may be added to the solution, including but not limited to, carrier brighteners (e.g. paratoluene sulfonamide, benzene sulfonic acid), levelers or second class brighteners (e.g. allyl sulfonic acid, formaldehyde chloral hydrate), auxiliary brighteners (e.g. sodium allyl sulfonate, pyridinum propyl sulfonate), and/or inorganic brighteners (e.g. cobalt, zinc).

In one embodiment, the NiCrAlY or NiCoCrAlY particles may be added to the solution with a slow, medium, or fast mixing rate. A "slow mixing rate" may be defined as a mixing rate of less than 10 g/L. A "medium mixing rate" may be defined as a mixing rate of 10-30 g/L. A "fast mixing rate" may be defined as a mixing rate of 30-60 g/L.

In addition to a Watt's electrochemical cell, it is envisaged that other types of nickel electroplating baths may be used in the present method, such as a Nickel sulfamate bath (nickel sulfamate, nickel chloride, boric acid), an all-chloride bath (nickel chloride, boric acid), an all-sulfate bath (nickel sulfate, boric acid), a hard nickel bath (nickel sulfate, ammonium chloride, boric acid), a black nickel bath (nickel ammonium sulfate, zinc sulfate, sodium thiocyanate), and the like.

The method for manufacturing the $Al_2O_3$-coated co-deposit further comprises pulsing DC current into the electrochemical cell. In one embodiment, the pulsing DC current has a maximum amplitude of 7 A, preferably 6 A, more preferably 5 A. In one embodiment, the pulsing comprises a repeating sequence with a DC current on-time for 1-4 ms, preferably 1-3 ms, more preferably 1-2.5 ms followed by a DC current off-time for 8-12 ms, preferably 8-11 ms, more preferably 9-11 ms. In one embodiment, the maximum amplitude of the DC current of the repeating sequence is the same during each DC current on time (e.g. a maximum amplitude of 5 A is repeated during each DC current on-time). In one embodiment, the duration of the DC current on-times is the same, and the duration of the DC current off-times are the same during the repeating sequence. In one embodiment, the pulsing electrodeposits Ni onto the substrate, whereby the electrodeposited Ni entraps Al and NiCrAlY or NiCoCrAlY particles to form the deposited layer comprising Ni, NiCrAlY or NiCoCrAlY particles, and Al particles.

The current density used during the electrodepositing may be variable depending on the application, and may range from 1 $mA/dm^2$ to 30 $A/dm^2$. For depositing small particles (<15 µm diameters) preferentially onto the substrate, a current density of 1-100 $mA/dm^2$, preferably 1-75 $mA/dm^2$, more preferably 1-50 $mA/dm^2$ may be used. For depositing larger particles (at least 15 µm diameters) preferentially, a current density of 0.1-30 $A/dm^2$, preferably 1-25 $A/dm^2$, more preferably 2-20 $A/dm^2$ may be used. As used herein, the term "preferentially" refers to the deposition of a particular particle size (e.g. small) more frequently or in higher amounts relative to a different sized particle (e.g. large), even though both particle sizes are likely to be deposited onto a substrate to a certain extent.

After and during the pulsing, the method of the present disclosure involves electrodepositing Al, Ni, and NiCrAlY or NiCoCrAlY onto the substrate to form a deposited layer comprising Ni, NiCrAlY or NiCoCrAlY particles, and Al particles.

In one embodiment, a plating deposit called a "flash" may be used to form a thin plating with high quality and good adherence to the substrate. This serves as a foundation for subsequent plating processes. A flash procedure often uses a high current density and a bath with a low ion concentration. The flashing method may also be used in combination with the plating of different metals. If it is desirable to plate one type of deposit onto a metal to improve corrosion resistance but this metal has inherently poor adhesion to the substrate, a flash may be first deposited that is compatible with both the substrate and the coating material.

The method for manufacturing the $Al_2O_3$-coated co-deposit further involves calcining the substrate comprising the deposited layer to oxidize the Al particles and form the $Al_2O_3$-coated co-deposit. In one embodiment, the temperature during the calcining is 900-1,200° C., preferably 950-1,175° C., preferably 975-1,150° C.

In one embodiment, the Al powder is mixed with the solution to form a layer having reduced porosity, e.g., relative to the same method under the same conditions without Al powder present in the solution. In one embodiment, mixing the Al powder with the solution of the Watt's electrochemical cell increases a surface coverage of $Al_2O_3$ on the co-deposit relative to the same method under the same conditions without mixing the Al powder with the solution of the Watt's electrochemical cell.

Including Al as part of the electrodeposition is an alternative method to other coating procedures commonly used for temperature protection, creep prevention, etc. For instance, after electrodeposition to form a superalloy deposit material, further processing steps are often carried out, such as aluminizing. In the present invention, the main temperature protection (a coating of alumina on the surface of the deposit material) is accomplished during the electroplating/calcining process, and no further steps are required to provide extra coating. Therefore, the method of the present disclosure may be used in lieu of a pack cementation process, a gas phase coating process, a chemical vapor deposition (CVD), a thermal spraying process, and a physical vapor deposition process.

In one embodiment, the method further involves adding a gas to the electrochemical cell to produce circulation in the solution during the pulsing and/or the electrodepositing. The gas may include oxygen, air, or an inert gas (nitrogen, argon, etc.). The method may further comprise agitating the electrolyte solution of the Watt's electrochemical cell to provide a more uniform solution and thus a more uniform coating, wherein the coating is a substantially uniform mixture of the various components describe herein. The agitating may include, but is not limited to, stirring, sonicating, shaking, swirling and the like.

The method may further comprise rotating the substrate about a first axis during the electrodepositing. The rotating may also involve rotating the substrate around a second axis that is non-parallel to the first during the electrodepositing. Rotating the substrate can provide a coating to the entire substrate. In one embodiment the substrate is evenly coated, where the average coating thickness differs by no more than 5%, by no more than 4%, by no more than 3%, by no more than 2%, by no more than 1%, at any given location on the surface of the substrate. Without rotating the substrate, it is possible to coat the substrate in an uneven fashion, where the average thickness differs by more than 5% at any given location on the surface of the substrate.

In one embodiment, the substrate has a complex shape with at least one hidden surface that is coated with the deposited layer.

Post processing procedures such as scrubbing, acid pickling, alkaline washing, heat treating, cleaning, masking, etching, blasting treatment, grinding, etc. may be used to treat the $Al_2O_3$-coated co-deposit after manufacture. Techniques to test the temperature stability and creep properties may be used to test the $Al_2O_3$-coated co-deposit of the present disclosure, and such techniques are known to those of ordinary skill in the art.

The examples below are intended to further illustrate protocols for preparing and characterizing the $Al_2O_3$-coated co-deposit and are not intended to limit the scope of the claims.

EXAMPLE 1

Materials

Nominal chemical composition of substrate material (Hastelloy X®) and NiCrAlY coating powder used in this study are shown in table 1.

TABLE 1

Chemical composition of Hastelloy ® X substrate and coating powder

| Material | Chemical Composition, wt % | | | | | | | | |
|---|---|---|---|---|---|---|---|---|---|
| | Ni | Cr | Al | Y | Co | Mo | Fe | W | Si/Mn |
| Hastelloy ® X (Nominal) | 47 | 22 | 0.5 | — | 1.5 | 9.0 | 18.5 | 0.6 | 1.0 |
| Hastelloy ®X (SEM-EDS) | 47.3 | 24.1 | — | — | — | 9.7 | 18.9 | — | — |
| Coating Powder | Bal. | 21 | 10 | 1 | — | — | — | — | — |

EXAMPLE 2

Pulse Electrodeposition

Hastelloy® X samples (10×10×3 mm) were metallographically ground and polished to a surface finish of 1 μm. They were degreased with acetone and rinsed with distilled water. The composition of Watt's bath used in this study was $NiSO_4.6H_2O$ (250 g), $NiCl_2.6H_2O$ (50 g) and $H_3BO_3$ (35 g) per liter of water. Pure Ni was used as the anode and Hastelloy® as the cathode during electrodeposition. The pH and temperature of the electrolyte were maintained at 3.6 and 45° C., respectively. Pulse electrodeposition was performed at a peak current of 5 A for a duration of 20 min. Pulse on-time ($T_{ON}$) and off-time ($T_{OFF}$) were kept at 2 and 10 ms, respectively. The bond coat thus produced had a predominantly Ni matrix with additions of NiCrAlY particles. These particles were introduced into the plating bath in the form of NiCrAlY or NiCrAlY+Al powders that get entrapped into the Ni matrix of the coating deposited on the substrate material. In this manner, co-deposition of Ni with NiCrAlY or NiCrAlY+Al powders on Hastelloy® X specimens was accomplished. Pure Al powder was used in addition to NiCrAlY for selected samples to increase the Al concentration at the outer surface of the electrodeposited coating.

Pulse electrodeposition is undertaken by periodic interruption of D.C. current supplied to the specimen being plated. This is achieved by applying series of pulses of D.C. current that have equal amplitude and duration in the same direction and are separated by periods of zero current. The pulse rate (frequency) and ON and OFF times (duty cycle) can be controlled to control the nature of coating being deposited. During the ON and OFF cycles in pulse plating, the surface of the specimen to be coated remains rich in metal ions and devoid of impurities to a large extent. When the current is ON, the metal ions next to the cathode are deposited. When the current is OFF, the metal ions present within plating solution diffuse into the layer next to the specimen. This process is repeated to deposit fine coatings. Additionally, during the OFF period in the cycle, gas bubbles and other impurities absorbed on the specimen get detached from the specimen. Pulse electrodeposition facilitates grain nucleation resulting in an increase in grain density. This result in a finer grained deposit with improved properties compared to conventionally plated coatings. Careful control of parameters such as bath composition, pH, temperature and overpotential is required to produce acceptable electrodeposition. A high nucleation rate is favored by high overpotential and low surface diffusion rates are made possible by pulse plating, which exhibits significantly higher current densities than the limiting DC current density [See Puippe, J. and Leaman, F, Theory and Practice of Pulse Plating, Orlando: Am. Electroplaters and Surface Finishers Soc., 1986, incorporated herein by reference in its entirety].

Electrodeposited samples were heat treated in argon for 2 h at ~1150° C. Diffuse heat treated samples were oxidized in air for 24 h at 1000° C. This is typically the high-end of peak temperature range that a bond coat gets exposed to during service in a turbine engine.

EXAMPLE 3

Materials Characterization

Field emission scanning electron microscope (FE-SEM, FEI Nova Nano SEM 230) was used to examine the size and shape of NiCrAlY powders as well as study the surface morphology of electrodeposited coatings. Imaging and microchemical analysis of cross-sectional coated samples was undertaken using SEM-EDS analysis. Electron transparent cross-sectional samples were prepared using focused ion beam equipment and microstructure at the coating-substrate interface was examined using 200 kV field emission transmission electron microscope (FE-TEM Model: JEOL JEM2100F). X-ray diffraction (XRD:Rigaku Ultima IV MPD) was used to identify various phases present within the coated as well as oxidized samples. An x-ray diffractometer equipped with a monochromator was used and diffraction spectra were generated using Cu K$\alpha$ radiation ($\lambda$=1.54184 Å) source operating at 40 kV and 40 mA. Phase identification was carried out using a Bragg-Brentano (BB) configuration with 2$\theta$/$\theta$ scan axis.

EXAMPLE 4

Results and Discussion
Nickel Deposit

Figure 1B:
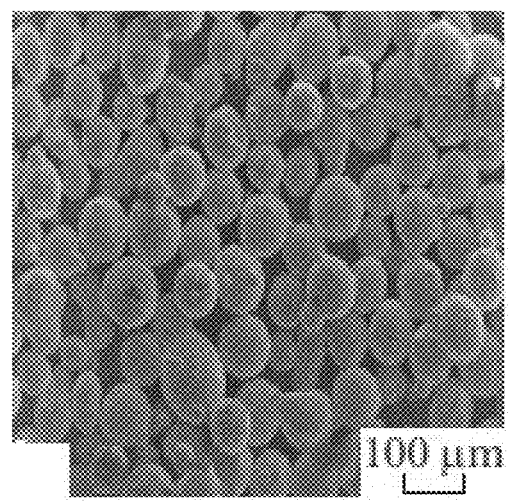
FIG. 1B is a SEM image of NiCrAlY powders 50-65 μm in size.
Figure 2A:
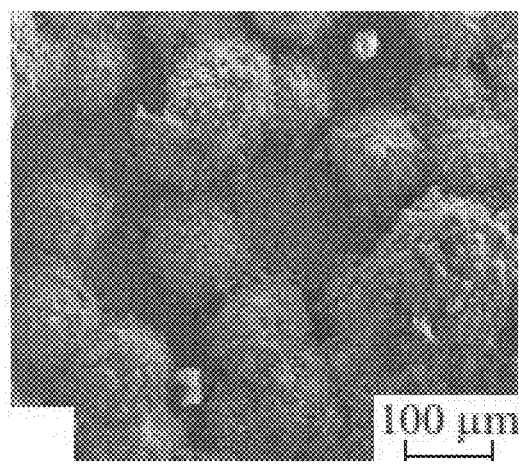
FIG. 2A is a SEM image of a top surface of Ni co-electrodeposited with NiCrAlY powder on a Hastelloy X substrate.
Figure 2B:
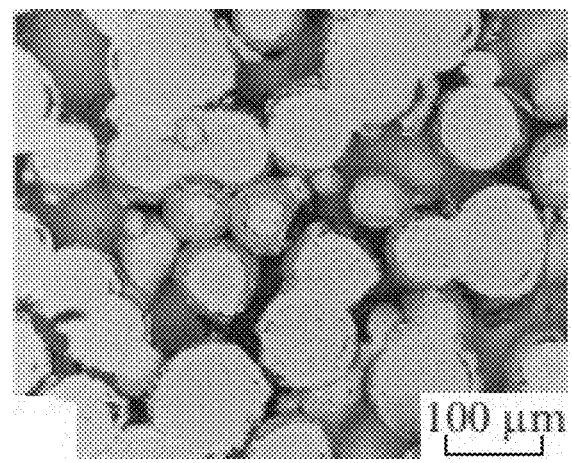
FIG. 2B is a SEM image of a top surface of Ni co-electrodeposited with NiCrAlY powder on a Hastelloy X substrate after slight grinding of top surface, where the coarse NiCrAlY particles are covered with an even and relatively fine-grained layer of Ni electrodeposit.
Figure 3A:
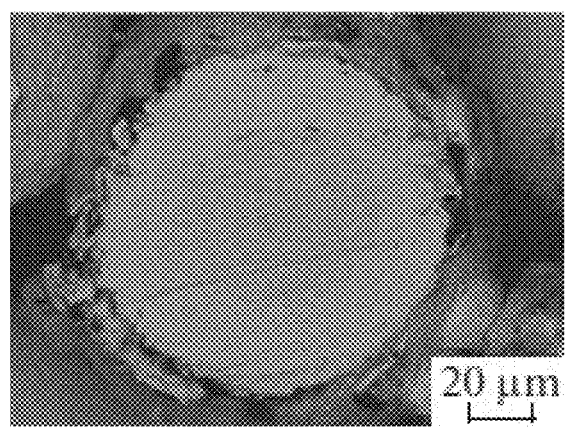
FIG. 3A is a cross-sectional SEM view of NiCrAlY particle covered with Ni.
Figure 3B:
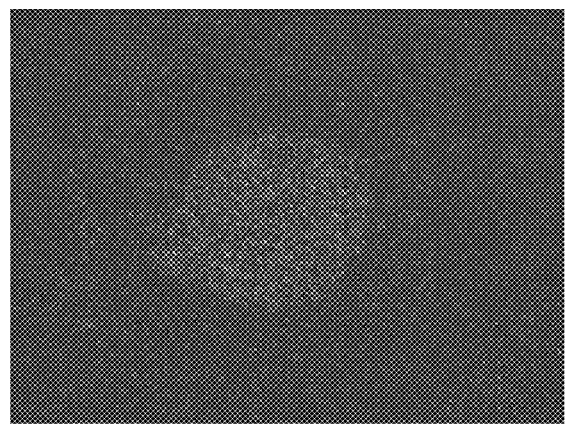
FIG. 3B is an X-ray mapping image showing elemental distribution of Al.
Figure 3C:
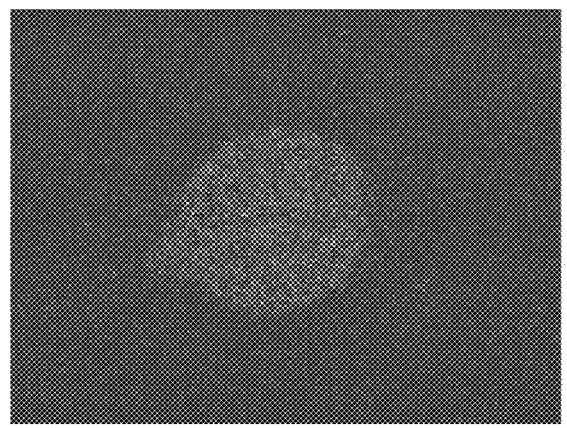
FIG. 3C is an X-ray mapping image showing elemental distribution of Cr.
Figure 3D:
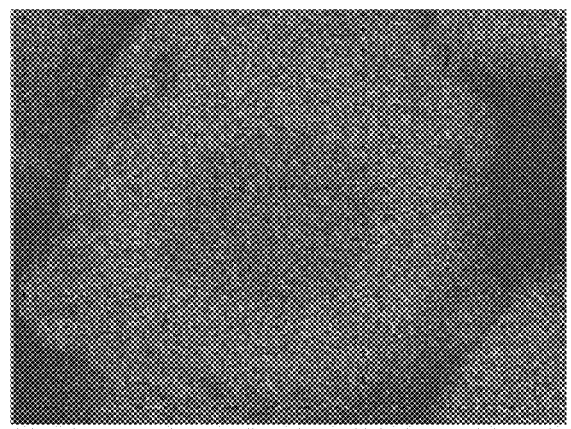
FIG. 3D is an X-ray mapping image showing elemental distribution of Ni in a Ni-coated NiCrAlY particle.
Figure 3E:
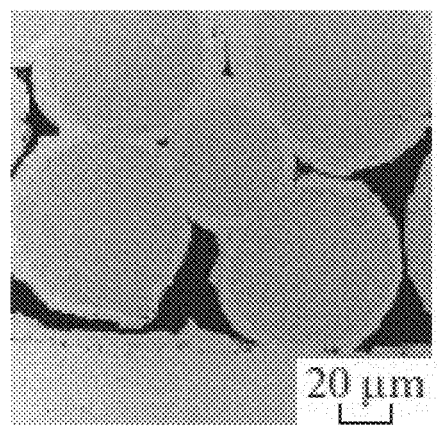
FIG. 3E is a cross-sectional SEM view of the Ni co-deposited with NiCrAlY powder.

The top surface of pure Ni coating obtained without co-deposition of NiCrAlY powder is shown in the FE-SEM image of FIG. 1A. The NiCrAlY powders used in this study were spherical with a diameter of 50-65 μm as shown in the SEM image of FIG. 1B. The top surface of Ni co-deposited with as-received NiCrAlY powder on Hastelloy® X substrate is shown in FIG. 2A. It can be seen that the coarse NiCrAlY grains are covered with a layer of fine electrodeposited Ni grains. This is visible in the SEM image of FIG. 2B where the top surface of the electrodeposited coating is mechanically ground to reveal the interface between NiCrAlY particles and electrodeposited Ni layer. Elemental distribution of Ni, Cr and Al is clear in the x-ray mapping images of a single particle shown in FIGS. 3A-3E. Coarse spherical NiCrAlY particles engulfed with Ni deposit demonstrate the ability of pulse electrodeposition to effectively coat complex shapes. Cross-sectional view of the Ni co-deposited with NiCrAlY sample is shown in FIG. 3E. It can be seen that NiCrAlY particles are engulfed in Ni deposit; however coarse pores are observed within the deposit due to large particle size of the NiCrAlY powder. Earlier studies have also indicated that co-deposited coatings contain high density of pores and voids. It has also been reported that due to a lack of Al concentration in the powder mix, sufficient concentration of Al$_2$O$_3$ required for oxidation resistance in service was not produced [See Gan, X. H., MS Thesis, Chin. Academy of Sci., 1992, incorporated herein by reference in its entirety]. Other studies have reported improved coating structure with reduced defects when fine grained powder mix was used. See Susan, D. F, Marder, A. R., and Barmak, K., *Thin Sol. Films,* 1997, vol. 307, p. 133 and Susan D. F. and Marder, A. R., *Oxidation Met.,* 2002, vol. 57, p. 159, each incorporated herein by reference in their entirety. Formation of substantial amount of Cr$_2$O$_3$ was reported for Ni—Cr based materials [See Zhang, Y, Peng, X., and Wang, E, *Mater. Lett.,* 2004, vol. 58, p. 1134, incorporated herein by reference in its entirety]. Coatings were electrodeposited with additional Al powder (5-10 μm in size) mixed with NiCrAlY powder.

Figure 4A:
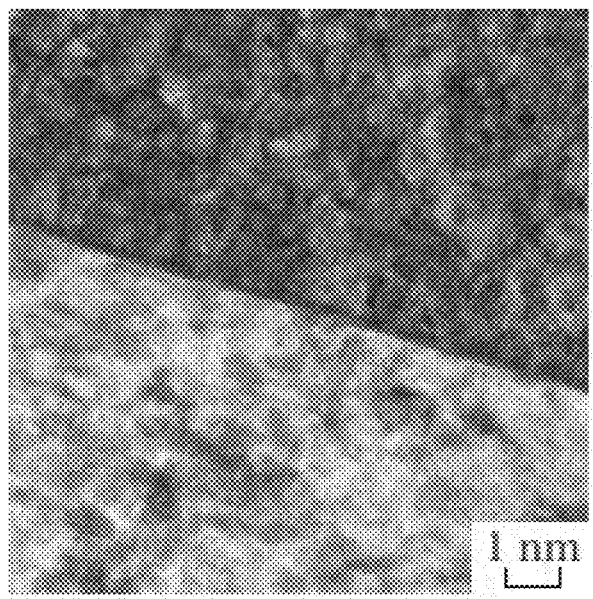
FIG. 4A is an expanded cross-sectional TEM image of the interface between Hastelloy X substrate and Ni deposit. The nickel deposit is fine-grained (1-5 nm) while interface is pore-free.
Figure 4B:
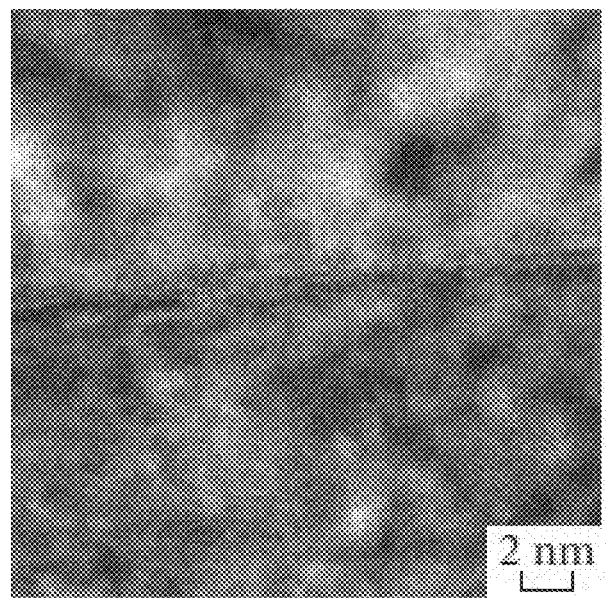
FIG. 4B is a cross-sectional TEM image of the interface between Hastelloy X substrate and Ni deposit.
Figure 4C:
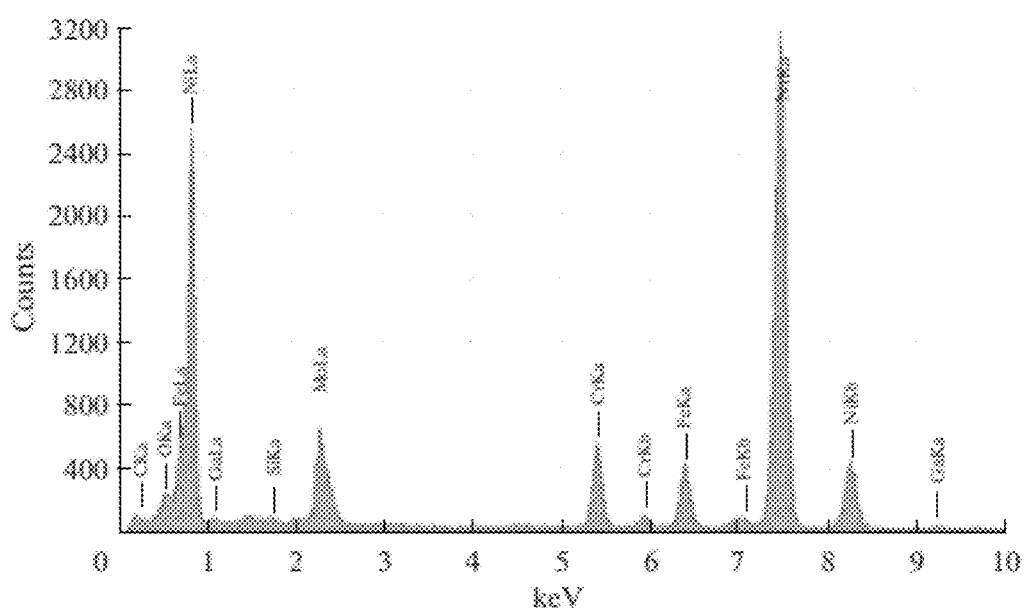
FIG. 4C is an EDS spectrum showing the elemental constitution of the alloy substrate.

The interface formed between the Hastelloy® substrate and deposited Ni was examined in cross-section using FE-TEM as shown in FIG. 4. The interface was found to be sound and devoid of any porosity as seen in FIGS. 4A and 4B. Nickel deposit exhibited a fine-grained morphology with a grain size of 1-5 nm at the substrate-deposit interface. Hastelloy® X typically exhibits single phase fcc solid solution structure in an annealed condition with the presence of a small concentration of second phase particles of molybdenum-rich carbide such as M$_6$C. EDS spectrum obtained from Hastelloy X (see FIG. 4C) corroborates the elemental constitution of the alloy shown in table.

NiCrAlY+Al Deposit

Figure 5A:
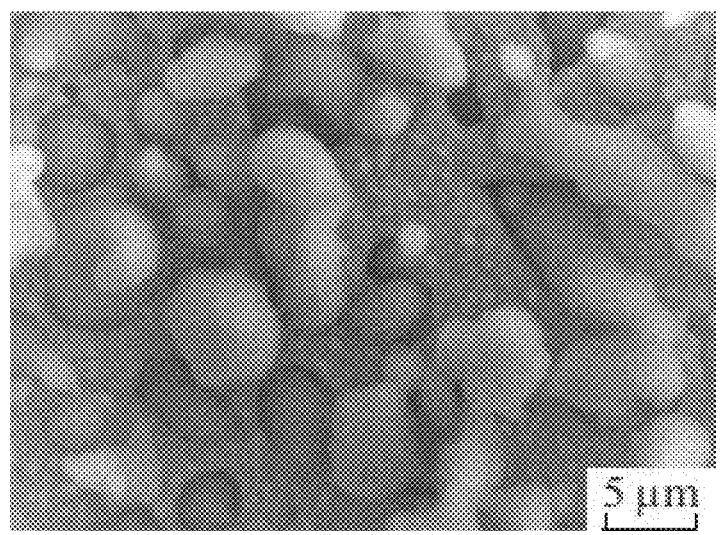
FIG. 5A is an SEM image of a surface morphology of the outer surface of the deposit where 5-10 μm Al particles are trapped in fine-grained Ni deposit.
Figures 5B, 5C:
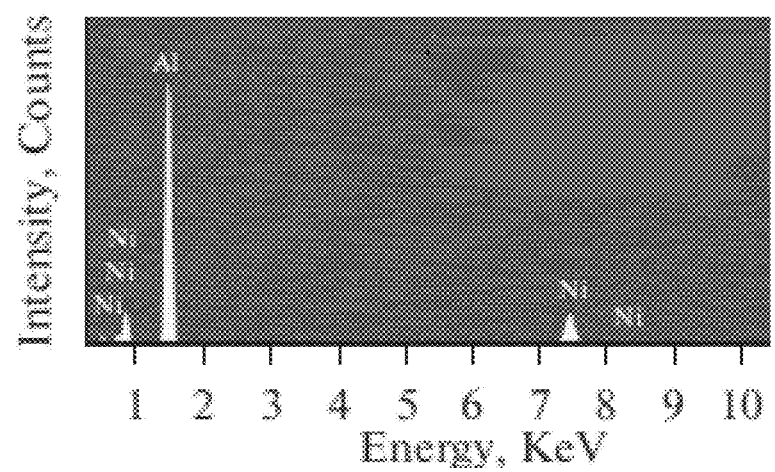
FIG. 5B is a SEM-EDS spectrum.
FIG. 5C is the corresponding elemental constitution showing high concentration of Al at the deposit surface.
Figure 5D:
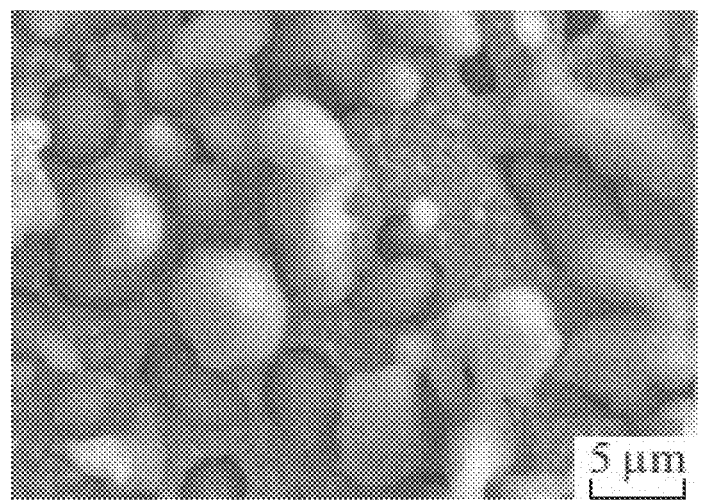
FIG. 5D is a SEM image of Al at the deposit surface.
Figure 5E:
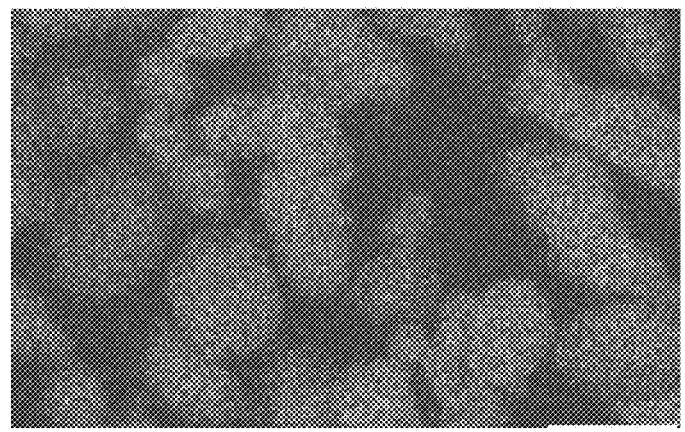
FIG. 5E is the X-ray mapping image showing distribution of Al at the deposit surface.
Figure 5F:
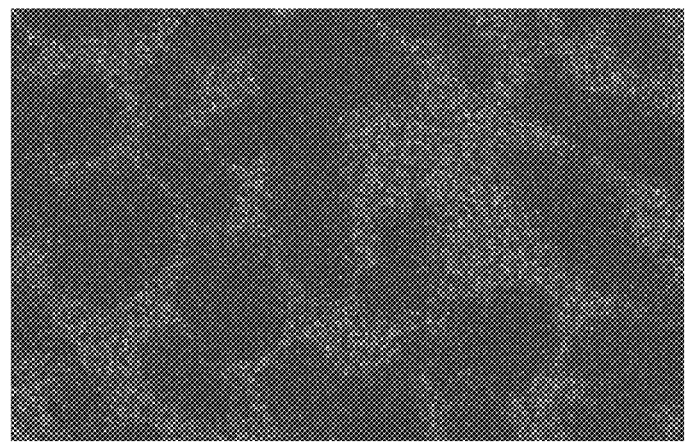
FIG. 5F is the X-ray mapping image showing a distribution of Ni at the deposit surface.

A high magnification SEM image of a specimen prepared with a mixture of NiCrAlY+Al powders is shown in FIG. 5A. Surface morphology of the top surface shows Al particles trapped in fine-grained Ni deposit. Microchemical area analysis using SEM-EDS shows high concentration of Al at the deposit surface (see FIG. 5B-5C). X-ray mapping images shown in FIGS. 5D-5F clearly indicate elemental distribution of Al and Ni at the top surface. It can be seen that Al-rich particles are entrapped in Ni-rich fine electrodeposit. Use of pure Al powder in addition to NiCrAlY produces Al-rich outer surface and could be considered as an alternative to using additional Al coating techniques apart from electrodeposition as has been suggested by previous workers.

Figure 6A:
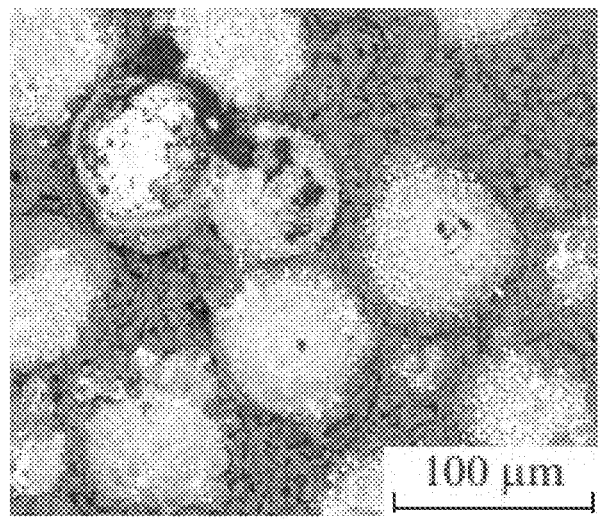
FIG. 6A is a SEM image of the top surface of the deposit after heat treatment at 1150° C. for 2 h. Protruding surfaces are NiCrAlY particles while the rest of the area is covered with Al particles entrapped in Ni deposit.
Figures 6B, 6C:
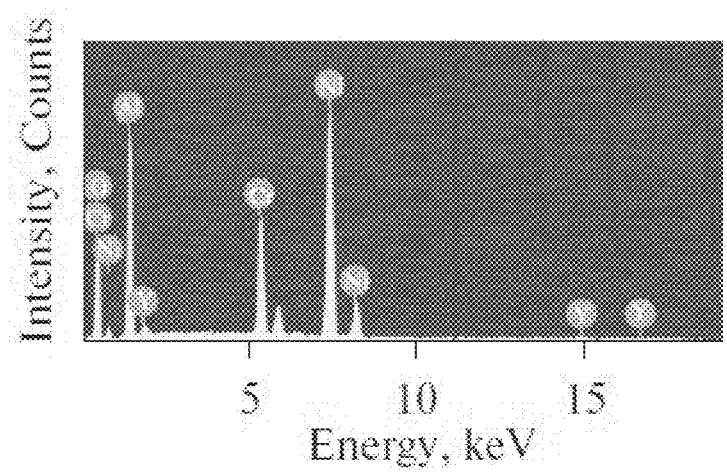
FIG. 6B is an EDS spectrum obtained from the top surface showing the presence of oxygen peak due to oxidation after heat treatment.
FIG. 6C is the corresponding elemental constitution of the deposit after heat treatment.
Figure 7A:
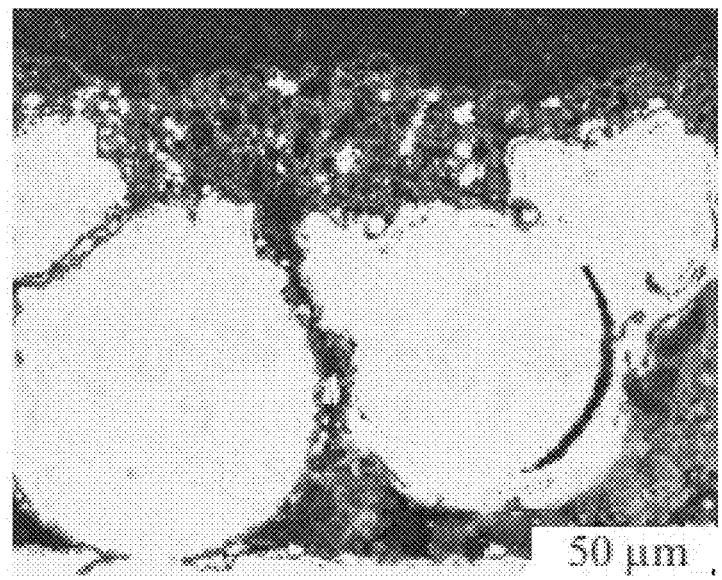
FIG. 7A is a cross-sectional SEM image of sample after heat treatment at 1150° C. for 2 h.
Figure 7B:
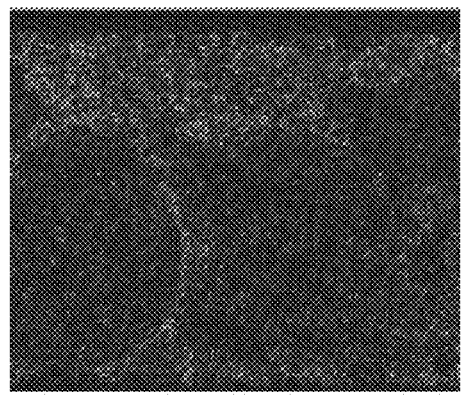
FIG. 7B is a corresponding X-ray mapping image showing distribution of O in the deposit.
Figure 7C:
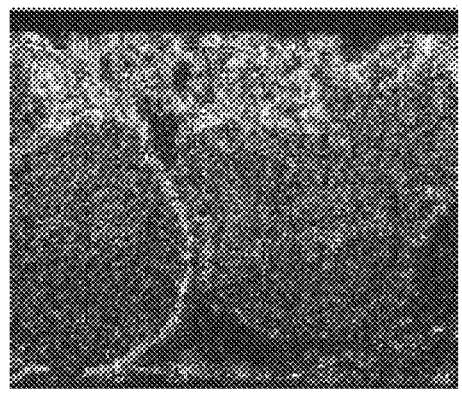
FIG. 7C is a corresponding X-ray mapping image showing distribution of Al in the deposit.
Figure 7D:
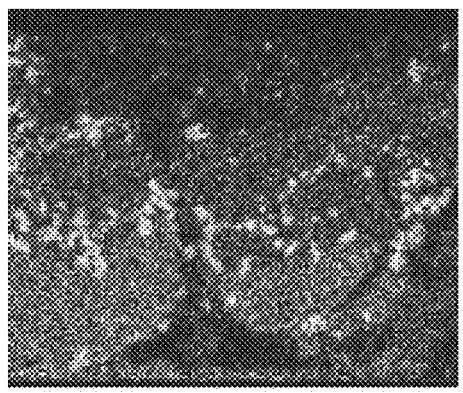
FIG. 7D is a corresponding X-ray mapping image showing distribution of Cr in the deposit.
Figure 7E:
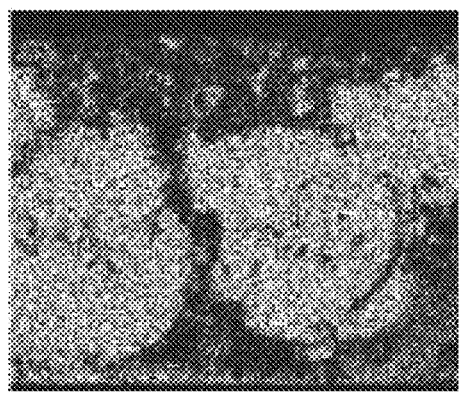
FIG. 7E is a corresponding X-ray mapping image showing distribution of Ni in the deposit. Al-rich oxide is formed at the outer surfaces of the deposit. Presence of Al at the alloy-deposit interface is observed while degree of porosity is reduced due to additional Al powder during deposition.

Top surface of the coated sample that was heat treated in argon atmosphere at 1150° C. for 2 h is shown in the SEM image of FIG. 6A. Protruding surfaces are NiCrAlY particles while the rest of the area is covered with Al particles entrapped in Ni deposit. EDS analysis of the top surface (FIG. 6B-C) showed that heat treatment resulted in slight oxidation of the outer surface. X-ray diffraction (Section 3.2) results show that the oxide consisted of Al$_2$O$_3$ along with NiO, NiCr$_2$O$_4$ and Cr$_2$O$_3$. A cross-sectional SEM view of the same sample in FIG. 7A and its associated X-ray maps (in FIGS. 7B-7E) confirm presence of Al and O at the outer surface. It can also be seen that Al-oxide is also formed at the outer surfaces of spherical NiCrAlY powder particles.

Presence of Al at the alloy-coating interface is also observed. It can also be seen that degree of porosity is largely reduced in this sample due to the addition of extra Al particles within NiCrAlY.

Figure 8A:
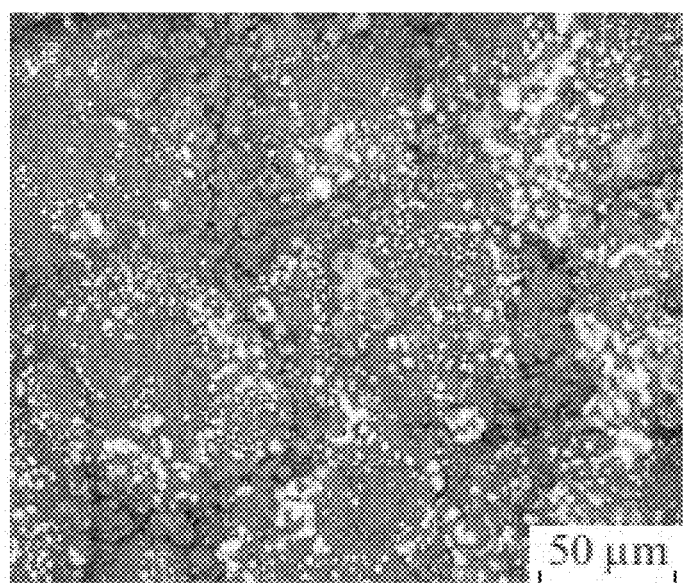
FIG. 8A is an SEM image of top surface of the deposit oxidized in air at 1000° C. for 24 h showing bright faceted NiO phase.
Figure 8B:
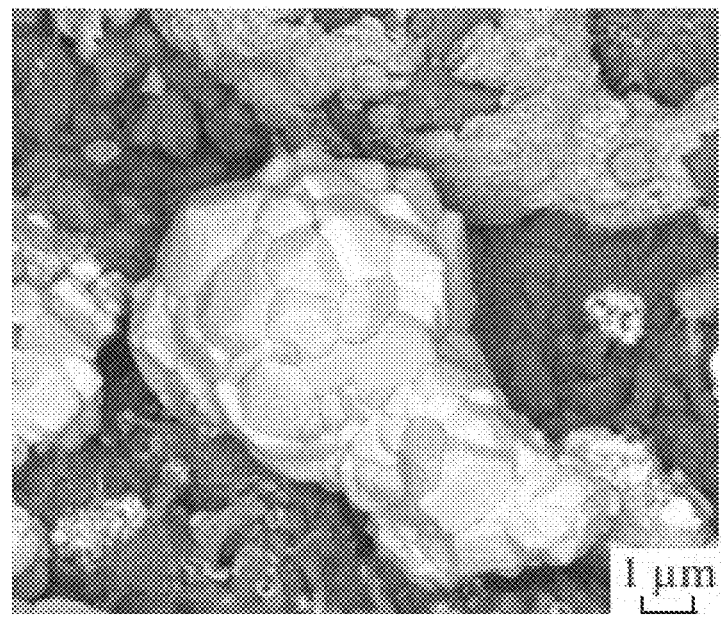
FIG. 8B is an expanded view of the SEM image of top surface of the deposit oxidized in air at 1000° C. for 24 h showing bright faceted NiO phase.
Figures 8C, 8D:
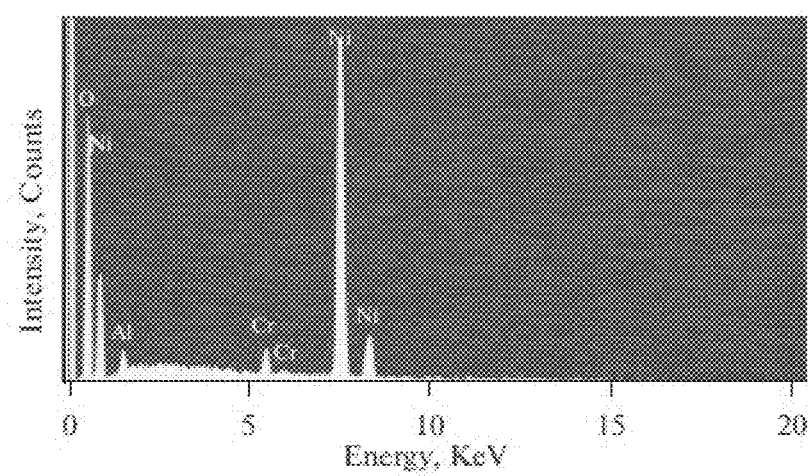
FIG. 8C is an EDS spectrum obtained from NiO confirming the presence of Ni and O as primary constituents.
FIG. 8D is the corresponding elemental composition of NiO.
Figure 9A:
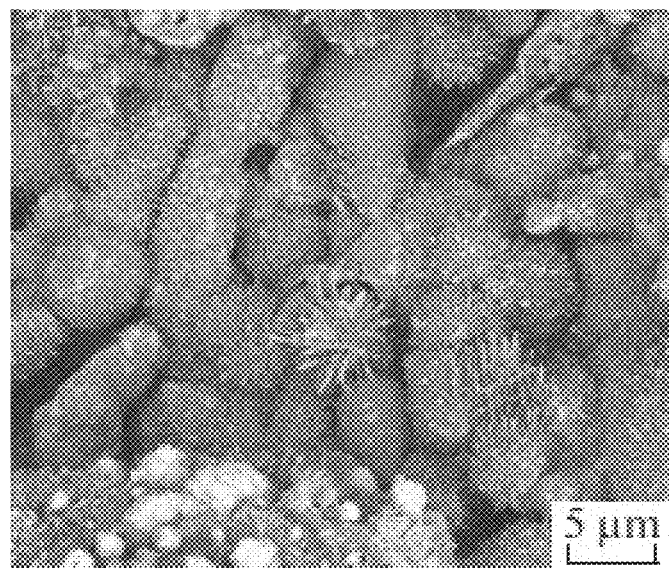
FIG. 9A is a SEM image of Al$_2$O$_3$ formed at the deposit surface showing whisker-like morphology.
Figure 9B:
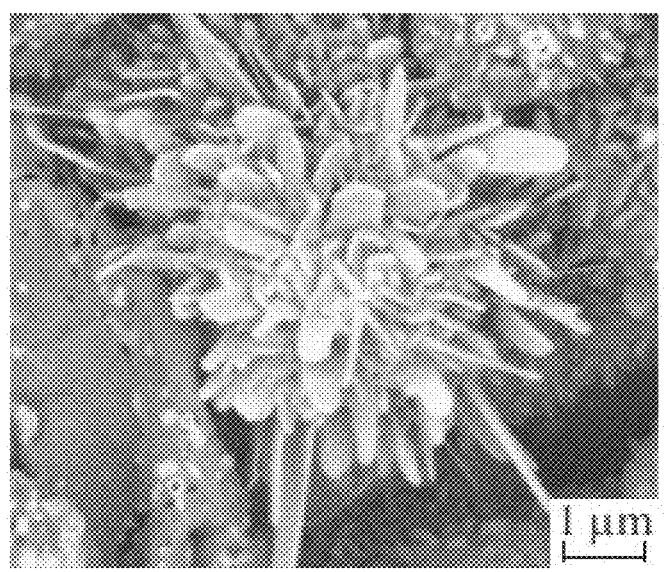
FIG. 9B is an expanded view of a SEM image of Al$_2$O$_3$ formed at the deposit surface showing whisker-like morphology.
Figures 9C, 9D:
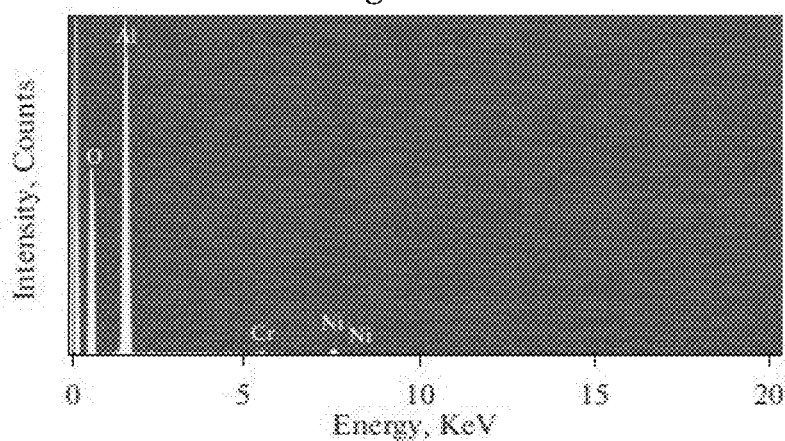
FIG. 9C is an EDS spectrum obtained from Al$_2$O$_3$ which showed high concentration of Al and O.
FIG. 9D is the corresponding elemental composition of Al$_2$O$_3$ formed at the deposit interface.
Figure 10A:
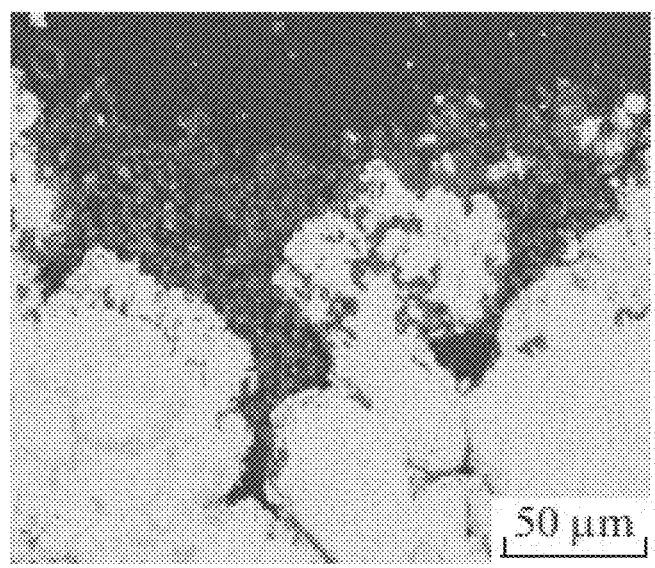
FIG. 10A is a cross-sectional FE-SEM image of an oxidized sample showing the formation of Al$_2$O$_3$ at the top surface of NiCrAlY particles.

Top surface of the coated sample oxidized in air at 1000° C. for 24 h is shown in FIG. 8A. Localized faceted particles (with bright contrast) were observed to form at the surface of NiCrAlY particles as shown in FIG. 8B. SEM-EDS analysis indicated Ni and O as primary constituents suggesting NiO phase (see FIG. 8C-D). SEM-EDS analysis showed that the area surrounding NiO was rich in Al, Ni, O and Cr. Apart from NiO presence at localized regions, formation of whisker-like Al$_2$O$_3$ was also observed at regions rich in Al particles used in the powder mix (see FIGS. 9A and 9B). The EDS spectrum obtained from this region showed high concentrations of Al and O (see FIG. 9C-D). Cross-sectional FE-SEM image of oxidized sample is shown in FIG. 10A. The oxide formed at the top surface of NiCrAlY particles is Al$_2$O$_3$ as shown in the EDS spectrum shown in FIG. 10B-C. Presence of NiO was also detected at localized regions.

EXAMPLE 5

Phase Identification

Figures 11A, 11B, 11C, 11D, 11E:
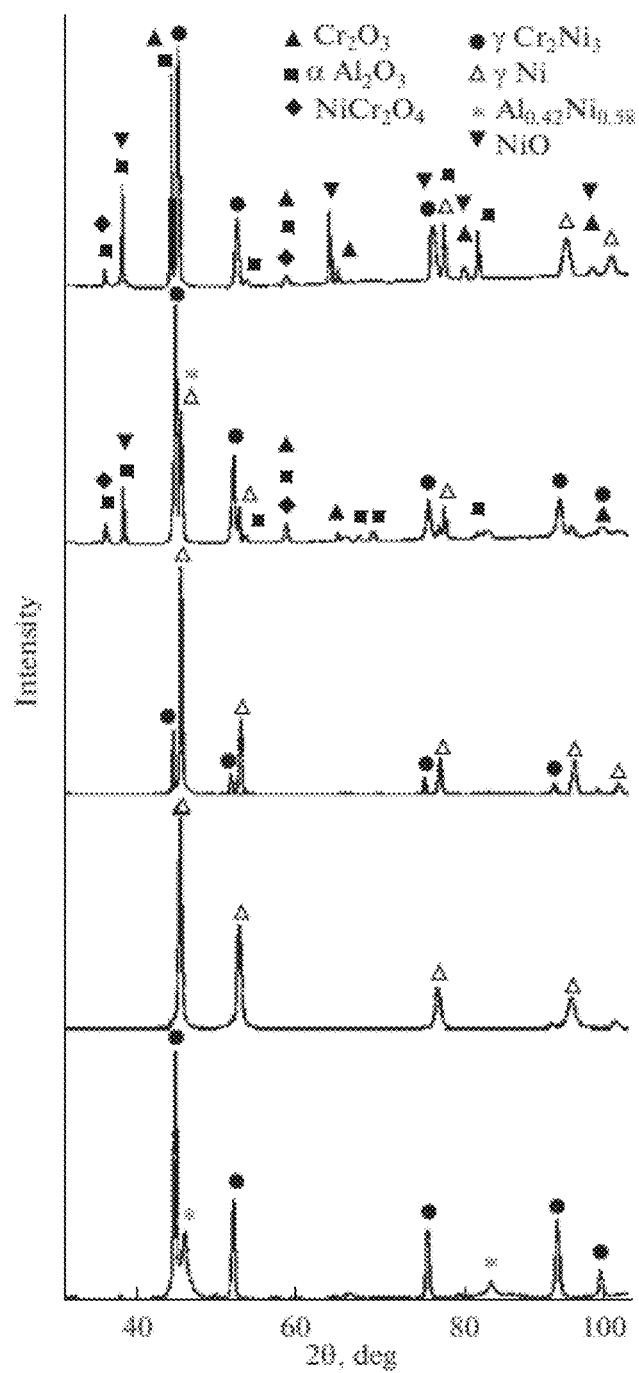
FIG. 11A is an XRD spectra of an oxidized co-deposit.
FIG. 11B is an XRD spectra of a heat-treated co-deposit.
FIG. 11C is an XRD spectra of an NiCrAlY electrodeposit.
FIG. 11D is an XRD spectra of NiCrAlY powder.
FIG. 11E is an XRD spectra of a Hastelloy® X substrate.

X-ray diffraction was used to identify the phases present in Hastelloy® X substrate, NiCrAlY powder and coated, heat treated and oxidized deposits as shown in FIGS. 11A to 11E respectively. X-ray diffraction spectrum obtained from alloy substrate (FIG. 11E) shows face-centered γ-Ni which agrees with a solid solution strengthened Ni-based alloy. Primary peaks originating from NiCrAlY powder (FIG. 11D) coincided with γ-($Ni_3Cr_2$) with a lattice constant of 3.5768 Angstrom. An increase in lattice size compared to pure γ-Ni (3.5238 Angstrom) is expected due to the presence of Cr. In addition, peaks coinciding with $Al_{0.42}Ni_{0.58}$ phase were also identified in NiCrAlY powder. X-ray spectrum obtained from a coated specimen was also indexed as shown in FIG. 11C. High intensity peaks originated from γ-Ni in alloy substrate followed by γ-($Ni_3Cr_2$) phase in NiCrAlY powder. Small peaks from $Al_{0.42}Ni_{0.58}$ phase were also identified. Presence of these phases in NiCrAlY coatings have been reported in the literature [See Partes, K., Giolli, C., Borgioli, E, et al., *Surf. Coat. Tech.*, 2008, vol. 202, p. 2208; Picas, J., Forna, A., Ajdelsztajnb, L., and Schoenung, J., *Powder Tech.*, 2004, vol. 148, p. 20; and Ajdelsztajn, L., Picas, J., Kim, G., et al., *Mater. Sci. Eng., Ser. A,* 2002, vol. 338, p. 33, each incorporated herein by reference in their entirety]. XRD spectra obtained from heat treated and oxidized samples are shown in FIGS. 11B and 11A, respectively. Both samples showed the presence of oxide phases such as $Al_2O_3$, $Cr_2O_3$, $NiCr_2O_4$ and NiO, thus corroborating microchemical EDS analysis results shown for the same samples earlier.

(1) Use of pulse electrodeposition technique produces fine grained Ni deposits that serve as a matrix to incorporate NiCrAlY particles resulting in co-deposited coatings.

(2) Nickel co-deposited with NiCrAlY powder tends to show relatively large number of pores. Extent of porosity can be reduced by employing fine NiCrAlY particles of 1-5 micron in dimensions during co-deposition.

The invention claimed is:

1. An $Al_2O_3$-coated co-deposit, comprising:
   a Ni-based substrate;
   an exterior layer present on a surface of the substrate, wherein the exterior layer comprises NiCrAlY or NiCoCrAlY particles with a diameter of 0.5-50 μm;
   Ni nanoparticles with a diameter of 0.1-10 nm, in the form of a matrix; and
   $Al_2O_3$ particles that are present on the exterior surface of the exterior layer.

2. The $Al_2O_3$-coated co-deposit of claim 1, wherein the $Al_2O_3$ particles have a diameter of 1-20 μm.

3. The $Al_2O_3$-coated co-deposit of claim 1, wherein 40-90% of a surface of the co-deposit is covered by the $Al_2O_3$ particles.

4. The $Al_2O_3$-coated co-deposit of claim 1, wherein the wt % of $Al_2O_3$ particles is 1-5% relative to the total weight of the exterior layer.

5. The $Al_2O_3$-coated co-deposit of claim 1, wherein the NiCrAlY particles comprise 64-74% Ni, 17-25% Cr, 6-14% Al, and 0.5-3% Y.

6. The $Al_2O_3$-coated co-deposit of claim 1, wherein the exterior layer comprises NiCrAlY or NiCoCrAlY particles with a diameter of 1-10 μm.

7. The $Al_2O_3$-coated co-deposit of claim 1, wherein the average thickness of the exterior layer is 50-200 μm.

8. The $Al_2O_3$-coated co-deposit of claim 1, which has a porosity of 5% or less.

9. A method for manufacturing the $Al_2O_3$-coated co-deposit of claim 1, the method comprising:
   immersing at least one surface of the substrate in a solution comprising at least one dissolved nickel salt, NiCrAlY or NiCoCrAlY particles, and Al particles in an electrochemical cell comprising a cathode comprising the substrate and an anode containing Ni;
   pulsing DC current into the electrochemical cell to electrodeposit Ni, along with Al and NiCrAlY or NiCoCrAlY particles onto the substrate to form a deposited layer comprising Ni, NiCrAlY or NiCoCrAlY particles, and Al particles; and then
   calcining the substrate comprising the deposited layer to oxidize the Al particles and form the $Al_2O_3$-coated co-deposit.

10. The method of claim 9, wherein the solution comprises nickel sulfate, nickel chloride, and boric acid.

11. The method of claim 9, wherein the pH of the solution is 3.3-3.9 and the temperature is 40-50° C. during the pulsing.

12. The method of claim 9, wherein the pulsing DC current has a maximum amplitude of 7 A.

13. The method of claim 12, wherein the pulsing comprises a repeating sequence with a DC current on-time for 1-4 ms followed by a DC current off-time for 8-12 ms.

14. The method of claim 13, wherein the maximum amplitude of the DC current of the repeating sequence is the same during each DC current on time.

15. The method of claim 13, wherein the duration of the DC current on-times is the same, and the duration of the DC current off-times are the same during the repeating sequence.

16. The method of claim 9, wherein the temperature during the calcining is 900-1,200° C.

17. The method of claim 9, wherein the Al powder forms a deposited layer that shows reduced porosity after calcining to form the $Al_2O_3$-coated co-deposit.

18. The method of claim 9, wherein the presence of Al powder in the solution increases a surface coverage of $Al_2O_3$ on the co-deposit relative to the same method under the same conditions without the presence of Al powder in the solution.

19. The method of claim 9, wherein the substrate has a complex shape with at least one hidden surface that is coated with the deposited layer.

* * * * *